(12) United States Patent
Motosko et al.

(10) Patent No.: US 10,844,656 B2
(45) Date of Patent: Nov. 24, 2020

(54) STORM PROTECTION SYSTEM

(71) Applicants: Stephen James Motosko, Sarasota, FL (US); Stephen J. Motosko, III, Sarasota, FL (US); Catherine Motosko, Sarasota, FL (US)

(72) Inventors: Stephen James Motosko, Sarasota, FL (US); Stephen J. Motosko, III, Sarasota, FL (US); Catherine Motosko, Sarasota, FL (US)

(*) Notice: Subject to any disclaimer, the term of this patent is extended or adjusted under 35 U.S.C. 154(b) by 200 days.

(21) Appl. No.: 15/942,700

(22) Filed: Apr. 2, 2018

(65) Prior Publication Data

US 2018/0230738 A1    Aug. 16, 2018

Related U.S. Application Data

(63) Continuation-in-part of application No. 14/743,331, filed on Jun. 18, 2015, now abandoned.

(60) Provisional application No. 62/013,576, filed on Jun. 18, 2014, provisional application No. 62/013,587, filed on Jun. 18, 2014.

(51) Int. Cl.
| | | |
|---|---|---|
| *E06B 9/15* | (2006.01) | |
| *E04H 9/14* | (2006.01) | |
| *E06B 9/58* | (2006.01) | |
| *E06B 9/00* | (2006.01) | |

(52) U.S. Cl.
CPC .............. *E06B 9/15* (2013.01); *E04H 9/14* (2013.01); *E06B 9/581* (2013.01); *E06B 2009/005* (2013.01); *E06B 2009/1583* (2013.01); *Y02A 50/00* (2018.01)

(58) Field of Classification Search
CPC .... E06B 9/581; E06B 9/15; E06B 2009/1577; E06B 2009/1583; E06B 2009/1588; E06B 2009/1594; E06B 2009/005; E06B 2009/1572
See application file for complete search history.

(56) References Cited

U.S. PATENT DOCUMENTS

| | | | |
|---|---|---|---|
| 1,705,085 A * | 3/1929 | Duncanson | ............... E06B 9/58 160/271 |
| 2,037,458 A | 4/1936 | Cornell | |
| 3,797,553 A * | 3/1974 | Elliott | ...................... E06B 9/58 160/267.1 |
| 4,586,552 A * | 5/1986 | Labelle | ................... E06B 9/582 160/133 |
| 4,715,421 A | 12/1987 | Erber | |
| 5,253,694 A | 10/1993 | Bernardo | |
| 5,482,104 A | 1/1996 | Lichy | |
| 6,068,040 A | 5/2000 | Magro et al. | |

(Continued)

*Primary Examiner* — Katherine W Mitchell
*Assistant Examiner* — Jeremy C Ramsey
(74) *Attorney, Agent, or Firm* — Dinsmore & Shohl LLP (57) ABSTRACT

A protection system for an opening of a building is provided. The system includes a pair of side rails where the pair of side rails each has a pair of offset elongated protrusions contained within a cavity of the side rails. Further, at least one slat extending between the pair of side rails, the slat adapted to connect with the pair of offset protrusions within the side rails. In most embodiments, a plurality of slats are provided to roll up when not in use. A clip is connected to a distal end of the slat, the slat adapted to directly connect to the offset elongated protrusions contained within the cavity of the side rails.

11 Claims, 9 Drawing Sheets

(56) References Cited

U.S. PATENT DOCUMENTS

| | | |
|---|---|---|
| 6,631,749 B1 | 10/2003 | Zabala |
| 8,365,801 B1 | 2/2013 | Motosko et al. |
| 2003/0041978 A1 | 3/2003 | Farooq |
| 2004/0188037 A1* | 9/2004 | Schlater .................. E06B 9/581 160/133 |
| 2009/0235602 A1* | 9/2009 | Ceccofiglio ............. E06B 9/581 52/473 |
| 2013/0048231 A1 | 2/2013 | Miller |
| 2014/0262084 A1* | 9/2014 | Fleischman ............... E06B 9/58 160/368.1 |

* cited by examiner

STORM PROTECTION SYSTEM

CROSS-REFERENCE TO RELATED APPLICATIONS

This application is a Continuation-in-part of application Ser. No. 14/743,331 filed on Jun. 18, 2015. Application Ser. No. 14/743,331 claims the benefit of U.S. Provisional Application 62/013,576 filed on Jun. 18, 2014. Application Ser. No. 14/743,331 claims the benefit of U.S. Provisional Application 62/013,587 filed on Jun. 18, 2014. The entire contents of these applications are incorporated herein by reference in their entirety.

FIELD OF THE INVENTION

The present invention discloses a storm protection system including a roll-up cover for an opening of a building. The cover is constructed of a plurality of overlapping slats with opposite end supporting clips, these being slidably engaged within opposing rails secured to the building proximate spaced apart sides of the opening. The clips and slats are configured to displace between extended/covering and rolled up/nesting positions relative to the opening without prying open the rails due to misapplied forces (including incidences of hurricane force winds acting upon the slats) exerted between the clips and rails. The clip design further provides for the end secured clips for each of the slats to nest neatly against each other in the rolled up position, thus preventing off-centering of the individual slats relative to one another.

BACKGROUND OF THE INVENTION

It is known in the art to provide a roll-up storm protection system over an opening of a building, such including windows and doorways. However, when rolled up, the systems are prohibitively bulky. The various slats and components of the prior known roll-up systems are bulky, further making it difficult to store when in a rolled-up position. An additional problem associated with known shutter assemblies is the tendency of misdirected forces resulting from inter-displacing motion of the slat end supporting clips within the respective rails, such forces also including those associated with storms and hurricane force winds, often prying open the rails about their outer closed ends, with the clips becoming disengaged resulting in failure of the shutter assembly.

Similar known systems include each of the roll-up/down storm shutter of U.S. Pat. No. 8,365,801 to Motosko, the rolling shutter with slat end retainer of Bernardo, U.S. Pat. No. 5,253,694, and the slat edge retainer for overhead rolling doors described in Magro, U.S. Pat. No. 6,068,040.

SUMMARY OF THE INVENTION

The present invention provides a roll-up type storm shutter protection system for installation over a structural opening. A pair of rails are adapted to secure to the structure proximate opposite extending side edges of the opening. Each of the rails includes inner and outer spaced walls separated by an end wall to define an accessible cavity.

A pair of protuberances project from the walls within the cavity, such that the protuberances are offset with respect to each other. A plurality of slats are supported between the rails, each of the slats having a curved body in profile.

A pair of clips are attached to opposite ends of each of the slats, such that the clips are supported within the rails. Each of the clips include a first linear portion extending from the attached end of the slat and between inwardly projecting end surfaces of the offset protuberances.

The clips each further include offset support surfaces which extend crosswise from the linear portion, and such that both the linear surfaces and crosswise support surfaces are guided along the end surfaces and adjoining side surfaces of each of the offset protuberances of the rails at each of first and second offset support locations for orienting the slats to displace along the rails between a first extended and covering condition over the opening and a second rolled-up condition revealing the opening in which the slats are nestingly supported away from the opening in a spiraled and overlapping arrangement.

The rails can each include a second cavity with a cap for covering an opening to the second cavity. A fastener is adapted to extend from the first cavity and through a portion of the cap connected to the second cavity. The cap may include an elongated leg. The screw extends through the elongated leg to further secure the elongated rail to the building. A fastener may be positioned at least partially within the cavity, so that the fastener extends through one of the sidewalls to connect to the building, with the cap covering the opening to the second cavity so as to hide the fastener from view.

In one embodiment, the cap includes an elongated leg, the elongated leg connected to a secondary fastener to secure the cap to the side rail. Further, a pair of offset elongated protrusions may be contained within the at least one cavity. Although commonly used for storm, wind, debris, rain . . . etc. protection, the construction of the slats may also provide sun and heat reflective properties for reducing heat buildup within the building.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE INVENTION

The present system relates to a storm protection system for the opening of a building. The present embodiment with a thinner clip and offset elongated protrusions contained within the side rails allows the slats connected together to rest on top of one another thus being smaller and less bulky as compared to the prior art.

The system includes a pair of side rails having a pair of offset elongated protrusions contained within the side rails. At least one slat extends between the pair of side rails wherein the slat is adapted to connect with the pair of offset protrusions contained within the side rails. In the present embodiment, the slats connect to the side rails by means of a clip fixedly connected to the distal ends of the slat and adapted to securely connect to the pair of offset protrusions contained within the side rails.

Figures 1, 2:
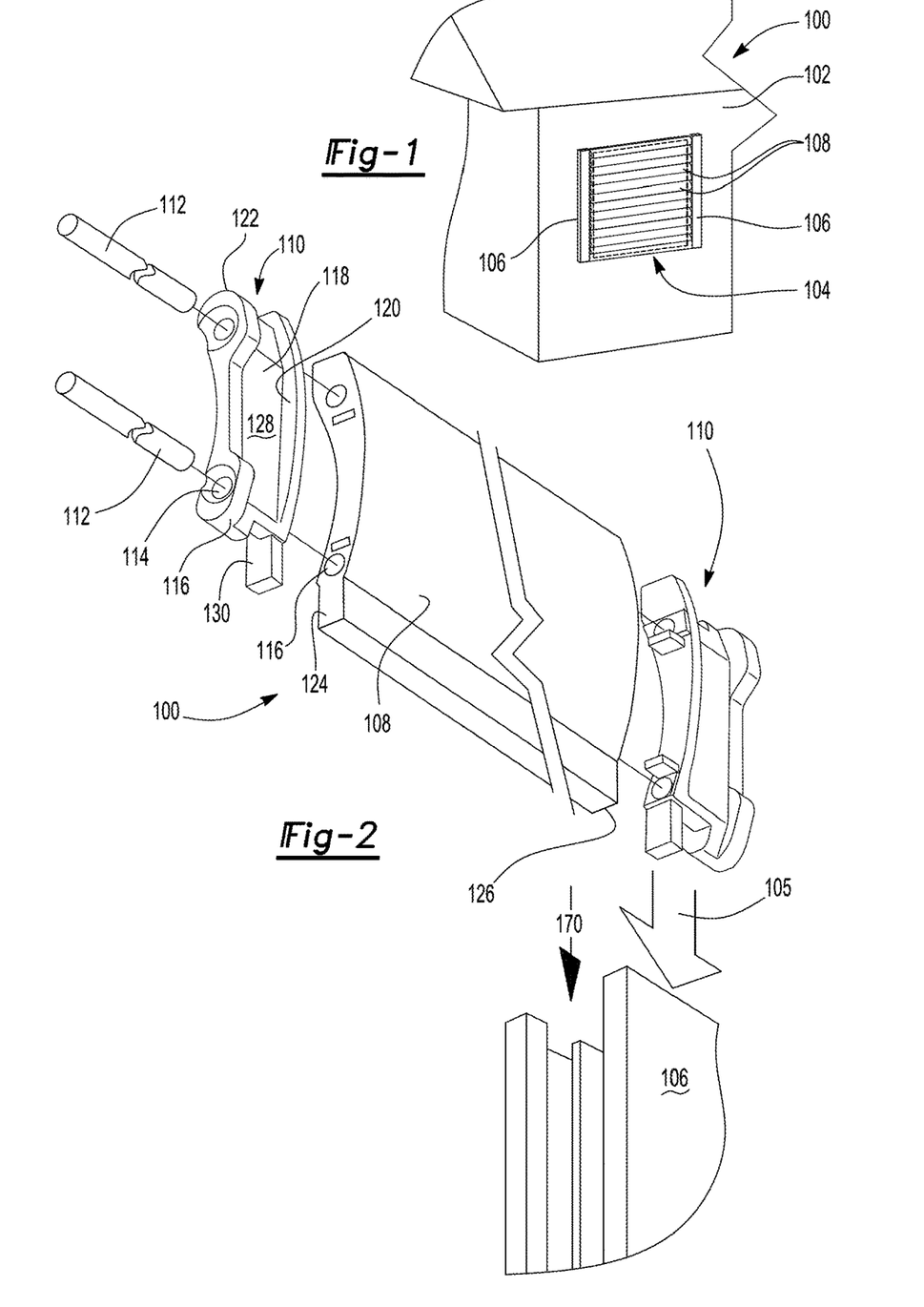
FIG. 1 illustrates an environmental view of the storm protection system of the present invention in an installed and rolled-down position.
FIG. 2 illustrates an exploded perspective view of the assembly of the present invention.

An environmental view showing the system 100 mounted on a building 102. The building 102 includes an opening, or a window 104. A pair of side rails 106 are disposed on opposite sides and generally vertically affixed to the building 102. A plurality of slats 108 connect to the side rails to cover the window 104. FIG. 1 illustrates the slats in a closed position to protect a window from storm damage. When not in use, the plurality of slats 108 roll up and are capable of being stored over the window 104.

The system 100 is further illustrated in the perspective exploded view of FIG. 2. The system generally includes a slat 108 having two clips 110 provided at either distal end of the slat 108. After installation and being rolled down, as illustrated by directional arrow 105, the clips 110 are adapted to slide into the side rails 106 and into the cavity 170 of the side rails 106.

The slat 108 includes a first distal end 124 and a second distal end 126. The distal ends 124 and 126 each include a pair of apertures 116 adapted to connect with the clip 110. The distal ends 124, 126 each include a generally planar surface to smoothly connect with the clips 110.

Note that in one embodiment, the slat may be extruded of, or include an outer coating or film of, heat and sun-reflective material which will substantially reduce heat transfer into the interior of the building as the extruded aluminum heat transference nature of the slats would have an opposite effect. The preferred material to be utilized in forming the slats is that of a heat light absorbing material such as a special polycarbonate material rather than being formed as an aluminum extrusion which would complicate exaggerate the heat and sun transfer energy into the building. Alternately, a light and heat reflective coating may be applied to the concaved outer surface of the slat to achieve a similar result in reflecting heat and light away from the interior the building.

The clips 110 include various connection features 130, 120 allowing the clips to easily nestle on top of one another. The clips 110 further include corresponding apertures 114 to accept pins 112. The pins 112 extend through the aperture 114 and through the aperture 116 to connect the clip 110 to the slat 108. Raised portions 120, 122 encourage the clips to nest on one another when in a rolled position.

Figures 3, 4:
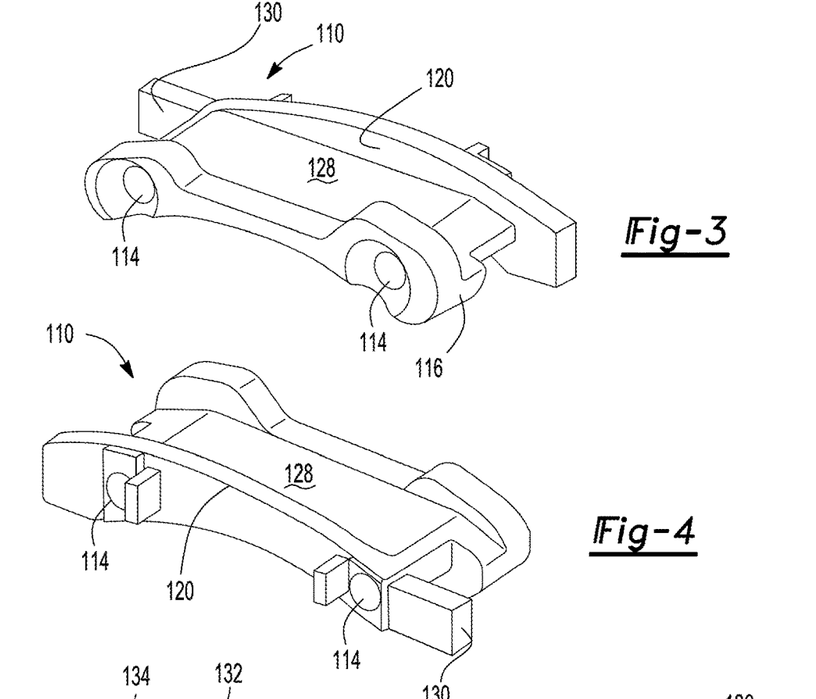
FIG. 3 illustrates a perspective view of the clip of the storm protection system of the present invention.
FIG. 4 illustrates an alternative perspective view of the clip of the storm protection system of the present invention.
Figure 5:
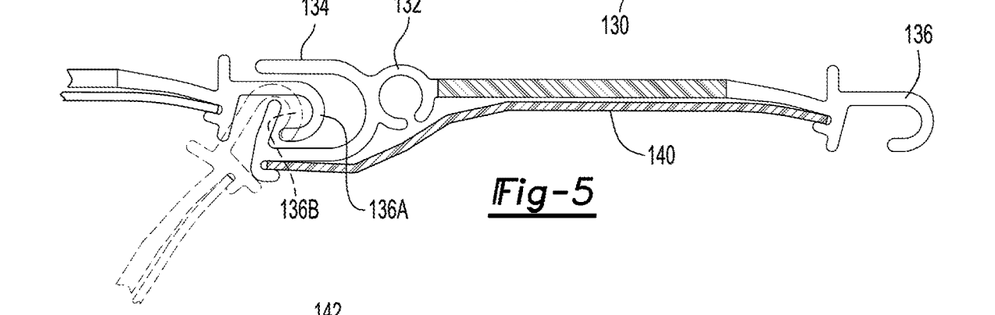
FIG. 5 illustrates a cross-sectional view of the slat of the present invention.
Figure 6:
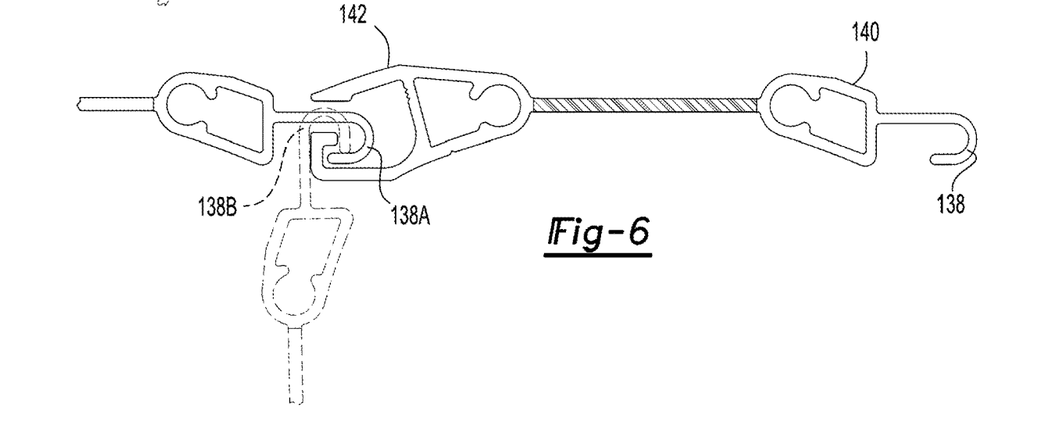
FIG. 6 illustrates an alternative embodiment of the slat of the present invention.

Various views of the clip 110 are illustrated in FIGS. 3 and 4. The clips further include an upper surface 128 adapted to nestle with a lower surface of the clip 110. The slats 108 are connected together by means of the connectors as illustrated in FIGS. 5 and 6. The connectors of FIGS. 5 and 6 are adapted to connect to one another based on the requirements and space constraints of the system. The connector as illustrated in FIG. 5 includes a hook portion 106 adapted to connect with a corresponding hook portion 132, 134. FIG. 5 illustrates hook portion 136 connected to the hook portion 134 in an extended position 136a and a rolled-up position 136b.

Similarly, FIG. 6 illustrates an embodiment of the connector having hook portion 138 and a connector portion. The opposite distal end of the connector portion 142 is provided connected to the hook 138. FIG. 6 illustrates the hook in an extended position 138a and a rolled-up position 138b.

A plastic or other polymer sheet 140 may also be provided connected to the connector, such as illustrated in FIG. 5, to provide added strength and resiliency. In the present embodiment, the plastic sheet 140 is placed on the outside. It should be appreciated that the sheet portion 140 may be placed on an inside portion (similarly arranged, similar to what is shown in U.S. Pat. No. 8,365,801). Alternatively, multiple plastic sheets may be arranged and attached to the system to provide increased protection. Even further, various materials may alternatively be used instead of a sheet. By way of example, insulating foam may be used to fill the gap and to further insulate the system. Alternative, an insulating liquid may be used. Further, alternative insulators, other than foam, may be used and incorporated into the system.

Figure 8:
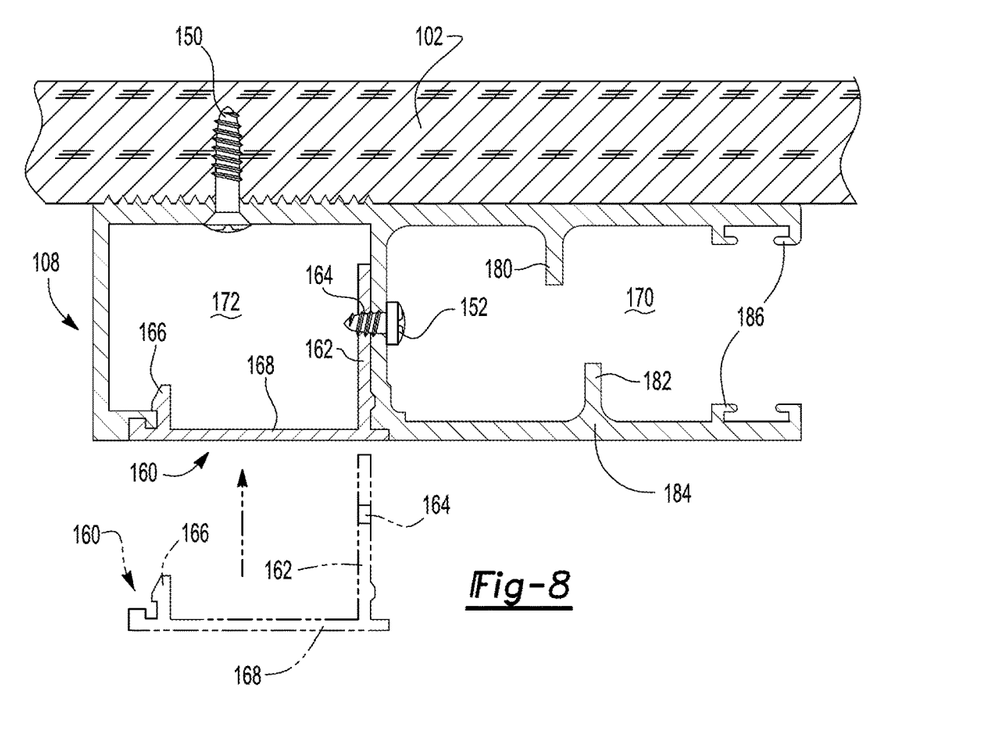
FIG. 8 illustrates a cross-sectional view of a side rail of the present invention.

An example of the side rail 108 is illustrated in FIG. 8. The side rail is generally extruded metal, such as aluminum or steel, but may also be made from a strong plastic, plastic like, polymer, or polymer like material so long as it provides sufficient resiliency and strength during a storm. The side rail 108 includes a first cavity 170 and a second cavity 172. The first cavity 170 includes a pair of offset elongated protrusions 180, 182. For purpose of the present description, the offset protrusions 180, 182 are shown each to include a linear interior profile (as subsequently described in FIGS. 15-16 these can also be reconfigured into other shapes) and which extend in inward fashion from elongated side wall portions 183 and 184 (see again FIG. 8) of the rail, these also having connecting portions 186 proximate their inwardly facing open end. A closed outer end wall 185 (again FIG. 8) is structurally supported by the inside surface mounted side wall portion 183.

Figure 7:
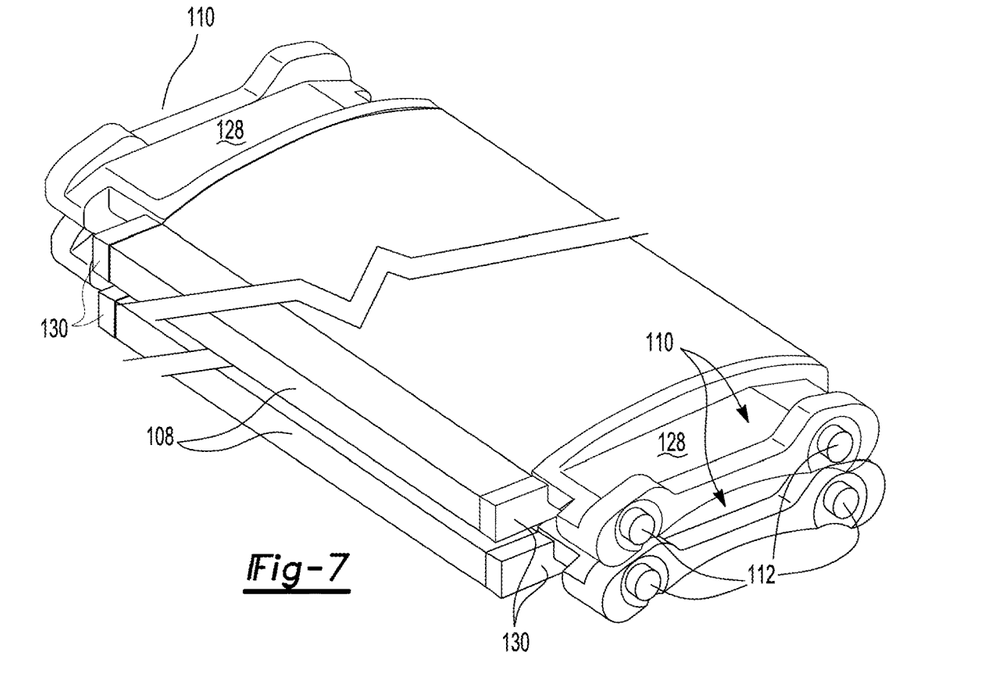
FIG. 7 illustrates a perspective view of the clip installed on a slat when the slats are in a rolled-up position.

The offset protrusions 180, 182 allow a smaller clip 110 to be used. Prior clips are bulky thus resulting in a bulky configuration when the slats are in a rolled-up configuration. The improved thinner clips 110 of the present invention are adapted to nest and rest nicely on top of one another, such as illustrated in FIG. 7. The offset configuration of the protrusions 180, 182 allows the smaller clip to be contained within the side rail 106 while still providing for a tight configuration. Furthermore, the offset configuration of the protrusions 180, 182 allows an installer to install a screw 152, such as illustrated in FIG. 8. The screw 152 provides an added security measure in that it secures a cap 160 which covers a second cavity 172.

The second cavity 172 allows the user to secure the side rail 108 to the building 102. A screw 150 extends through a screw aperture within the cavity 172. For aesthetic and protective reasons, a cap 160 is adapted to connect and cover the cavity 172. The cap 160 includes an outer portion 168 having a clip portion 166 engaging an end profile 167 as mounted in spaced and inwardly facing direction from the outer end wall 185, the cap also having an extended leg 162. The extended leg 162 includes an aperture 164 which is adapted to connect to the screw 152 via an intermediate interior wall 189 against which the leg is abutted. The screw 152 is installed through the interior wall 189 and leg 162 from the first cavity 170 to the second cavity 172. The offset nature of the interior extending and elongated protrusions 180, 182 allows an installer to more easily access the aperture 164 and install the screw 152. After the cap is installed, a thief is not able to access the screw 150. Accordingly, the cap 160 and the corresponding screw 152 provide for an additional safety and security means when the side rails and storm protection system are installed.

Figure 9:
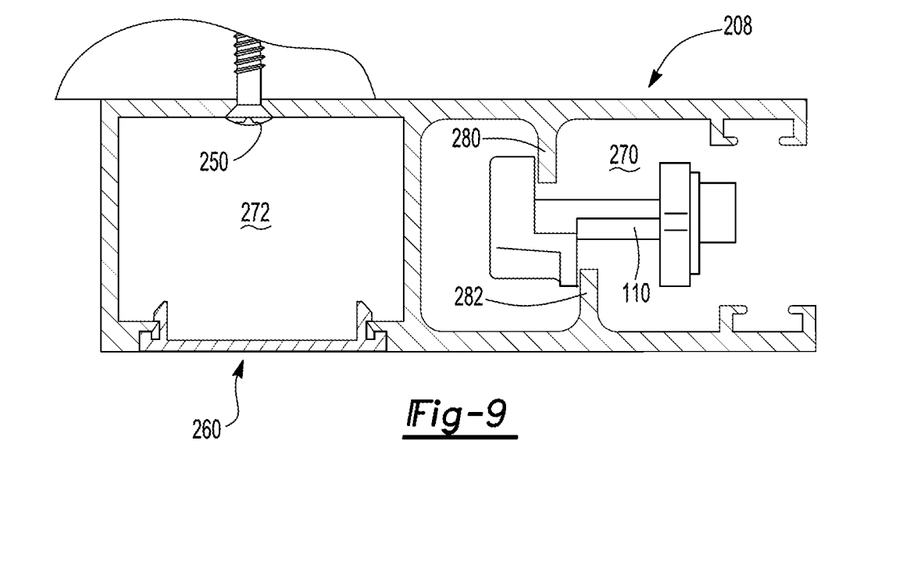
FIG. 9 illustrates a cross-sectional view of an alternative embodiment of the side rail of the present invention.

FIG. 9 illustrates an alternative embodiment of a side rail 208. The side rail 208 further includes elongated protrusions 280, 282 adapted to connect to the clip 110. Similarly, the side rail 208 includes a clip 260 having a shorter leg but still adapted to cover a second cavity 272.

Figure 10:
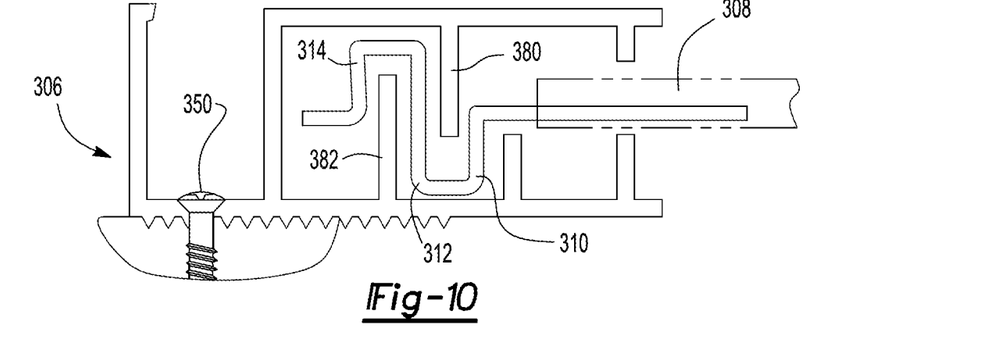
FIG. 10 illustrates an alternative embodiment of a side rail and slat having an integrally formed clip.

In further alternative embodiments, such as illustrated in FIG. 10, a slat 308 is integrally connected with the clip portion 310. In the embodiment as illustrated in FIG. 10, the clip portion includes a plurality of bend portions 312, 314 which are adapted to connect and wind around the pair of offset protrusions 380, 382. A screw 350 may also be used to connect the side rail 306 to a building. A cap, not shown, may also be used to secure access to the screw 350. The cap may be of a similar configuration as to the caps illustrated in FIGS. 8 and 9.

Figure 11:
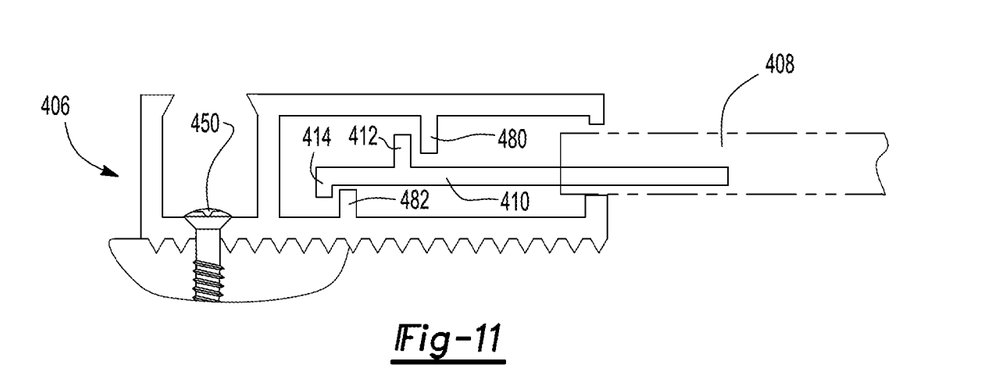
FIG. 11 illustrates another embodiment of a side rail and a slat having an alternative embodiment of an integrally formed clip.

A further alternative embodiment is illustrated in FIG. 11. A slat 408 is integrally connected with a clip portion 410 having protruding portions 412, 414. The protruding portions 412, 414 are adapted to extend around and connect with the pair of elongated protrusions 480, 482. Similarly, a screw 450 is adapted to connect the side rail 406 to a building. Also, a cap similar to those shown in FIGS. 8 and 9 will also be used in this embodiment.

Figure 12:
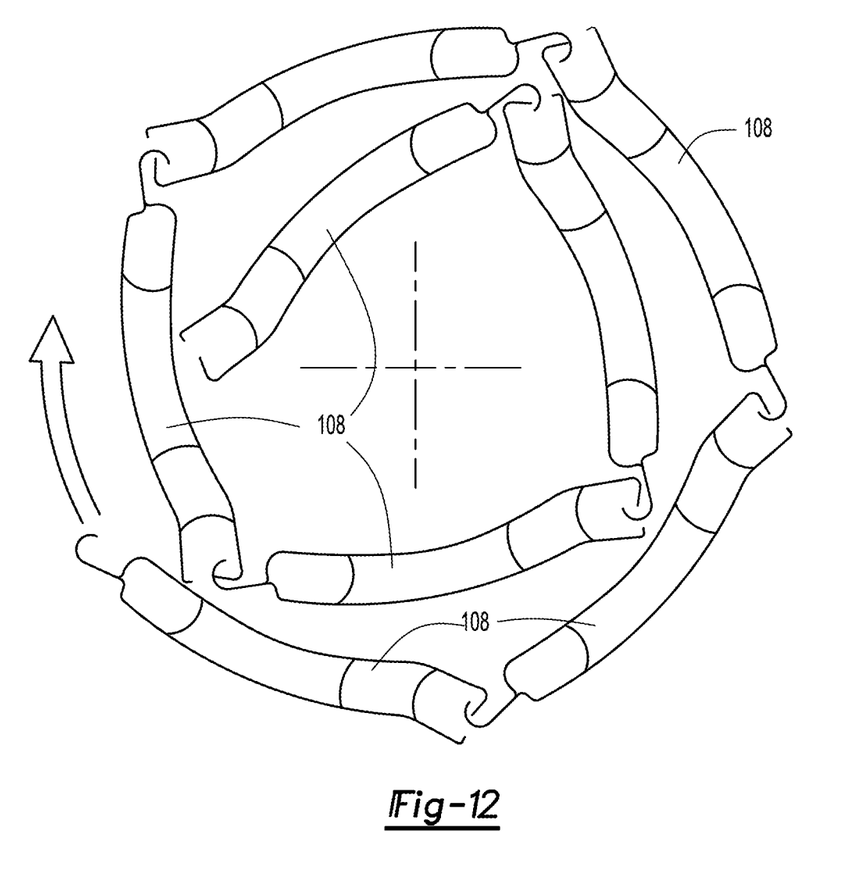
FIG. 12 illustrates a side view of an assembly of slats connected together and in a rolled-up position.

FIG. 12 illustrates the plurality of slats connected together and in a rolled-up position, and such as which can be stored inside of an enclosure, see as generally represented by four sided box structure and which can be supported above the structure opening, the box structure including an appropriate slot or edge through which the slats are displaced between the extended and rolled up positions. The present embodiment with a thinner clip and offset elongated protrusions contained within the side rails allows the slats connected together to rest on top of one another thus being smaller and less bulky as compared to the prior art.

Figure 13:
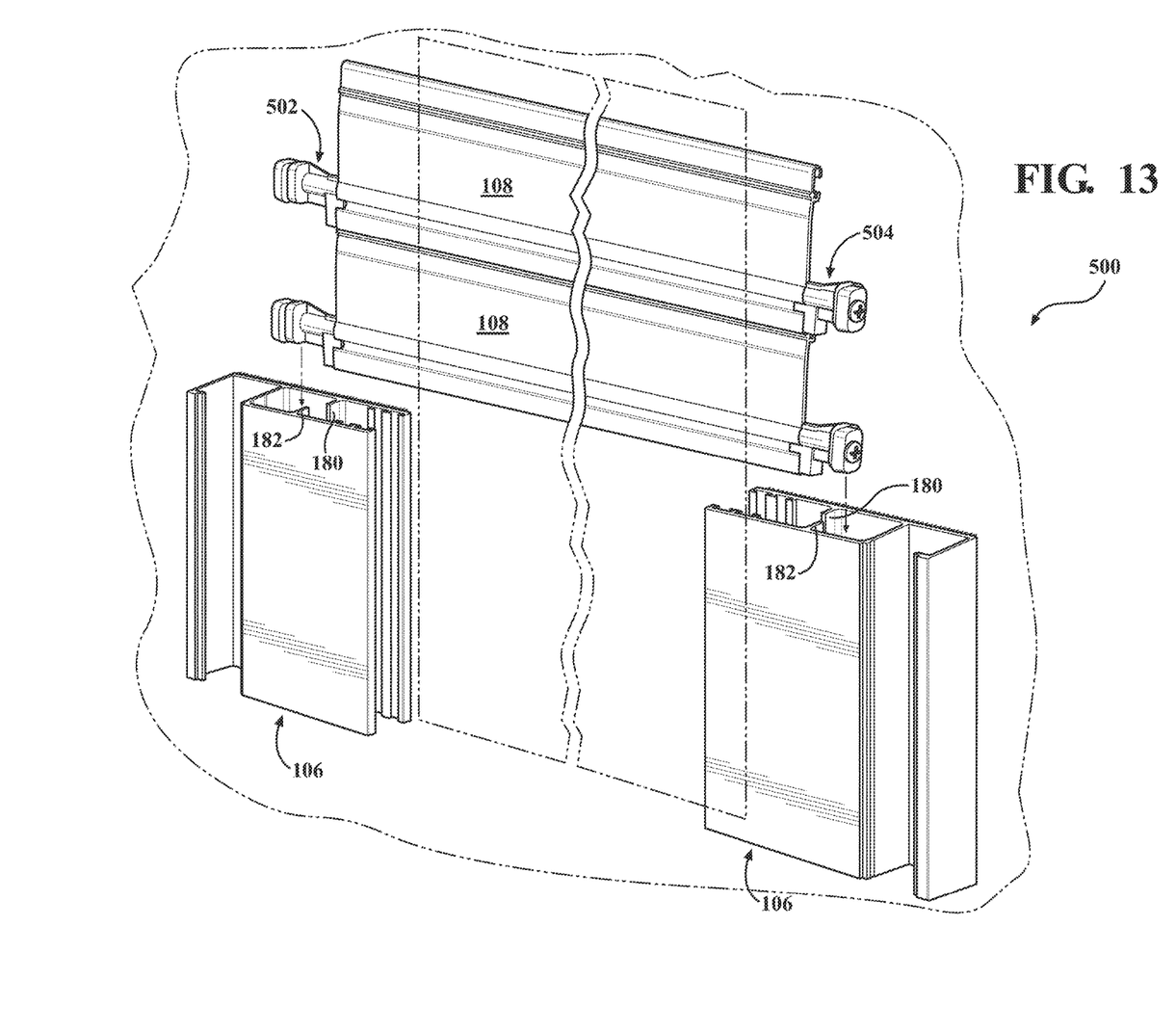
FIG. 13 is an exploded perspective of a storm protection system according to a further preferred embodiment and illustrating revised clips incorporated into opposite ends of the slats, the offset support surfaces of the clips being in contact with each along inside surfaces and which are supported in sliding fashion along the offset interior protuberances associated with the rail.

Referring now FIG. 13, an exploded perspective is generally shown at 500 of a storm protection system according to a further preferred embodiment. Reconfigured clips are depicted at 502 and 504 which are secured to opposite ends of the slats, previously depicted at 106.

Figure 14:
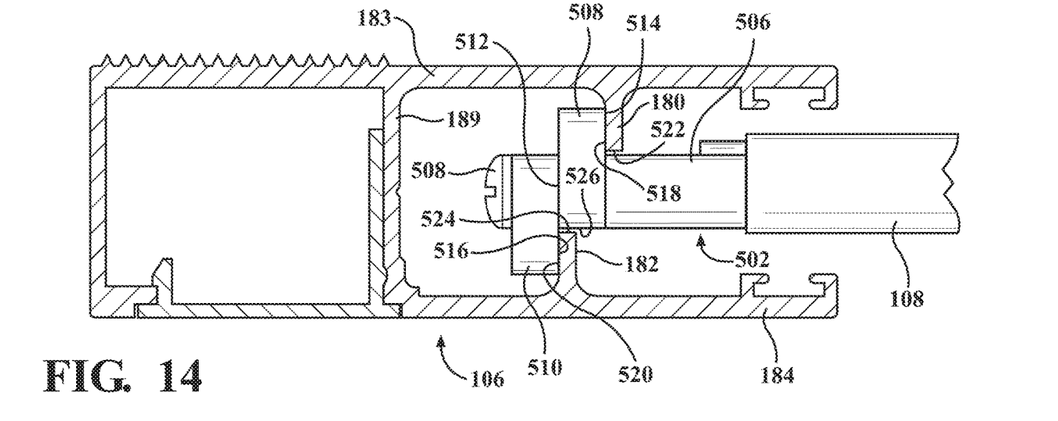
FIG. 14 is a top plan view of a selected rail and interior supported clip/slat arrangement such as depicted in FIG. 13, and which the offset and crosswise extending portions of the clip are in mutual support against side surfaces of each of the inwardly extending rail protuberances.

As further shown in the top plan view of FIG. 14, selected clip 502 is depicted in slidably supported fashion within rail 106. The clip can be constructed of any suitable material (such as not limited to a durable plastic or metal) and includes a linear extending main body 506, such having a sleeve shape. The body 506 can be hollow internally and in order to receive an outer end mounted screw 508 for extending through the clip body and engaging into an aligning aperture end of the given slat 106. Without limitation, the linear extending main portion 506 of the clip can be alternately secured to the end of the slat by any other fasteners or can be integrally formed with the slat in given embodiments.

As further shown by either clip version 502/504, and as best depicted in FIG. 14 with clip 502, a pair of extending offset support portions 508 and 510 are provided which extend in generally opposite and offset directions relative to the linear portion 506. Without limitation, the clip can be molded or cast in which the tubular or sleeve shaped linear portion and offset support portions are a single piece. The offset support portions 508 and 510, as well as with those depicted with each of the succeeding clip designs of FIGS. 15-18, are dimensioned so that they are a single continuous body in contact with each (see interface line 512), with the understanding that additional variants can include the portions 508/510 having some spatial separation from each other along the linear portion 506.

Displacement of the clips along the rails is facilitated by the sliding support profiles established between the side surface of the offset portions, see at 514 for selected portion 508 and at 516 for further selected and opposite extending portion 510. The inward offset protuberances 180 and 182 of the rail 106 likewise include side surfaces (see selected at 518 and 520) which are in close sliding proximity to the surfaces 514/516 of the clip offset portions 508/510 when the clips and slats are supported within the rail. Concurrently, end surfaces 522 and 524 of the protuberances 180 and 182 are likewise established in close sliding proximity to a surface of the linear portion 506 (in the instance of the end surface 522 of the first protuberance 180) or, in the instance of the second protuberance 182, its end surface 524 being in coincidental and sliding contact with an end surface 526 of the selected first offset portion 508.

An objective of the clip design is to provide fairly close tolerances between the clips and the rail interior and to limit either of sliding or pivoting motion of the clips and slat ends within the opposing rails, this being a disadvantage of many prior art designs. By this design, incidences of excessive slop or play established between the clip and the rail (and its interior protuberances) will often otherwise result the generation of excessive jamming or misdirected forces within the rail which, when aggregated by the number of clips/slats, can result in the outer wall 184 of the rail 106 prying away from the inner wall 183, about the interconnecting wall 189, resulting in the clip 502/504 becoming disengaged from the rail. It is also known that high winds (including the incidence of impact forces resulting from objects carried in such winds) can also result in prying open of the rails and disengagement of the clips/slats.

In one embodiment, the clip design of the present invention seeks to avoid the shortcomings of prior art designs (and in particular to prevent prying open or other structural failure) by providing a much neater tolerance profile between the opposing and sliding support surfaces established between the clip and the offset rail protuberances. As illustrated, this can include a continuous sliding contact established between the side surfaces of the protuberances 180/182 and the offset clip support portions 508/510 being complemented by a concurrent and close dimensional tolerance (such as in the order of a few millimeters or less) between the end surfaces of the protuberances and the opposing linear support locations of the clip. In this fashion, the present design increases both the design pressures and strength of the overall storm panel/shutter assembly.

Figure 15:
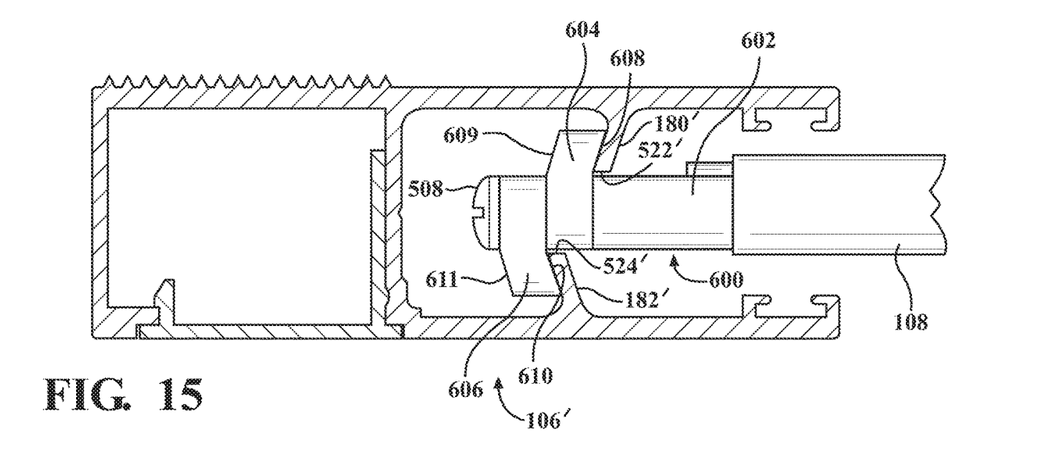
FIG. 15 is a top plan view similar to FIG. 14 of a variation of both the clip and rail having tapered profiles along each of the rail protuberances and opposing support surfaces of the clip in contact with the rail protuberances.

Proceeding to FIG. 15, a top plan view similar to FIG. 14 is shown of a further variation of both a clip 600 and rail 106', these exhibiting opposing tapered profiles along each of redesigned rail protuberances 180' and 182' and opposing support surfaces of the clip in contact with the rail protuberances. As shown, the clip 600 includes a linear portion 602 (generally identical to that shown in FIG. 14) and mounted to the slat 108 by end screw 508.

Opposite extending portions 604 and 606 of the clip 600 are shown projecting from the linear portion 602 of the clip, these further including tapered side surfaces (at 608 and 610, respectively) which oppose the tapered side edge profile of the redesigned protuberances 180'/182'. Reverse outward faces of the portions 604 and 606 further exhibit recessed taper notches 609 for portion 604 and at 611 for portion 606. The reverse face notches 609/6011 of a given clip seat or nest with the forward facing notches 608/610 of either of a preceding or succeeding clip in order to nest the clips in the retracted or wound position in similar fashion as depicted for the version of FIG. 14 (further viewing FIG. 19).

Figure 16:
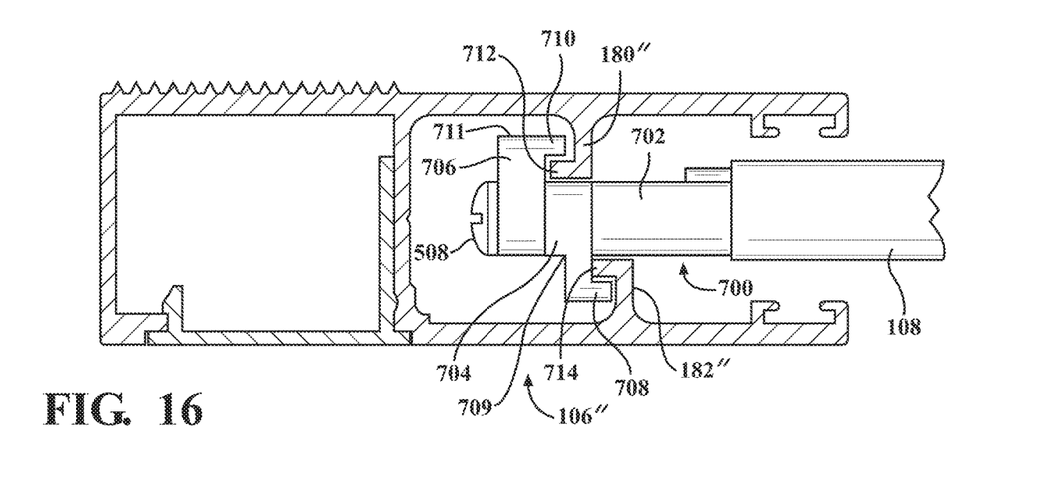
FIG. 16 is a top plan view of a further version of clip and rail in which the inward extending and offset rail protuberances and opposing clip support surfaces each exhibit opposing extending hook or bayonet portions.
Figure 17:
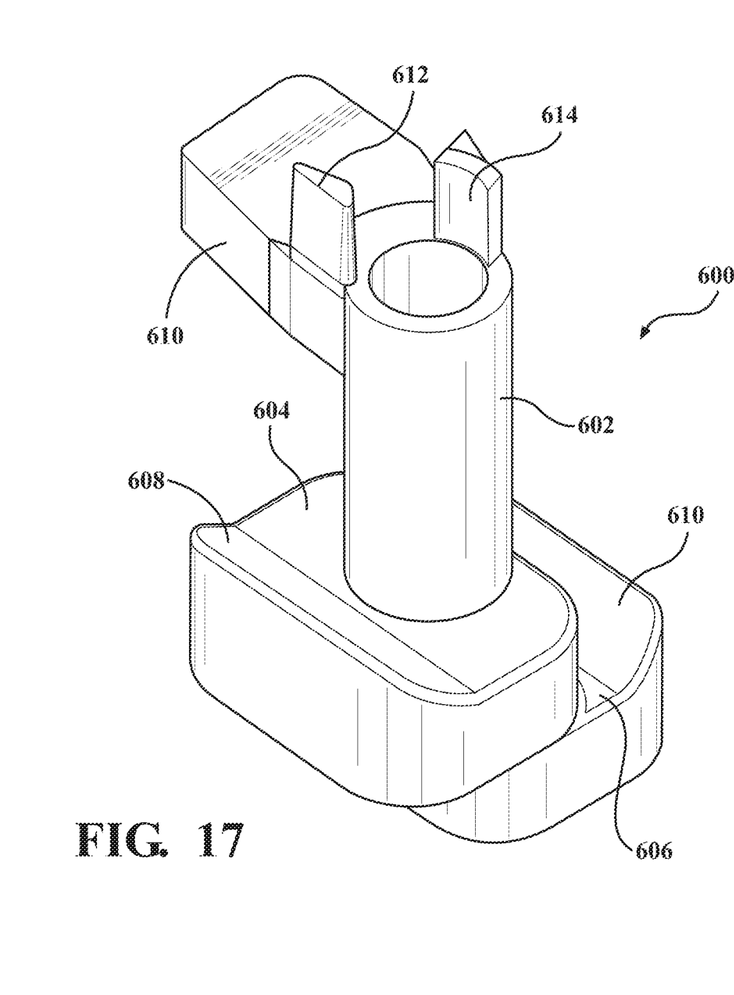
FIGS. 17-18 are a pair of first and second rotated perspective views of selected clips detached from a supporting rail and illustrating, respectively, edge protrusions associated with each of the sloping version of FIG. 15 and the bayonet or hook version of FIG. 16.

FIG. 17 is a perspective view of a selected clip 600, separated from the slat 108, and depicting the sloping tapered profiles 608/610 of the offset portions 604/606 and which in the illustrated embodiment extend in a common direction (as with the more radial profile of the side support surfaces of the clip portions 508/510 in FIG. 14). Additional mounting structure, including tab 610 and fingers 612/614 are provided at the inner end of the clip linear portion 602 and facilitate mounting to the receiving slat end location (such as further assisted by the end screw 508). The dimensioning of the slats is further such that the end mounted clips will each exhibit a profile such as show in any of FIGS. 14-16, and by which the common facing side support surfaces of the clip offset support portions are closely aligned with the opposing side profiles (straight or tapered) of the rail interior protuberances.

As with the variant of FIG. 14, end surfaces 522' and 524' of the redesigned protuberances 180' and 182' are configured to closely dimension the linear support locations of the clip, and in such a fashion that any misalignment forces exerted upon the clips by the slats are distributed across the tapered surface profiles established between the clips and rail protuberances, with the closely dimensioned opposing end surfaces between the protuberances and clips further assisting in providing both sliding support and limiting pivoting or bending of the clip within the rail.

Proceeding to FIG. 16, a top plan view is shown of a further version of clip 700 and rail 106", and in which the inward extending and offset rail protuberances and opposing clip support surfaces each now exhibit opposing extending hook or bayonet portions. This is depicted by the clip having a linear portion 702 from which extend in opposite and offset fashion a pair of support portions 704/706.

The support portions each include a like direction extending tab edges (at 708 for offset portion 704 and at 710 for offset portion 706), these respectively seating with further redesigned protuberances (at 180" and 182") which further include bayonet or hook end portions 712 and 714. In this manner, the opposing extending and overlapping configuration established between the offset portion tab edges 708/710 and the rail protuberance hook portions 712/714 provide similar close dimensioned support and anti-pivot or bend profile between the clips and the rails. Similar to the tapered recess notching depicted on the reverse side of the clip engaging portions in FIG. 15, selected offset portion 704 exhibits a cutout profile of perpendicular edge surfaces (see as depicted by inner corner 709) and which, in combination with the outer surface profile (at 711) of the other offset portion 706, provides a similar retracted/rolled-up nesting relationship when nested with the configuration of the offset portion 706 associated with each of preceding and succeeding clips of the adjoining slats, and in a fashion similar to that shown in FIG. 19 for the selected version of FIG. 14.

Figure 18:
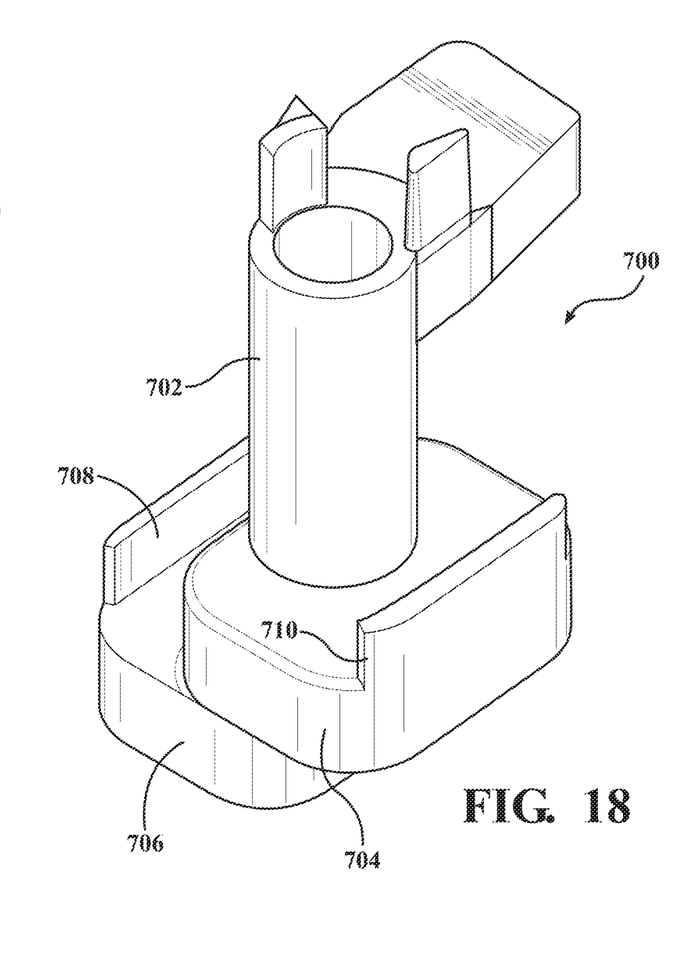

Reference is also made to FIG. 18 which depicts the version of the clip in FIG. 16 removed from the slat. As shown, the alternating engaging profile established between the edge extending portions 708/710 of the clip support portions and hook shaped ends 712/714 of the redesigned rail interior protuberances similarly limits bending or pivoting of the slat and clips within each of the opposing rails, thereby minimizing prying forces exerted upon the rails.

Figure 19:
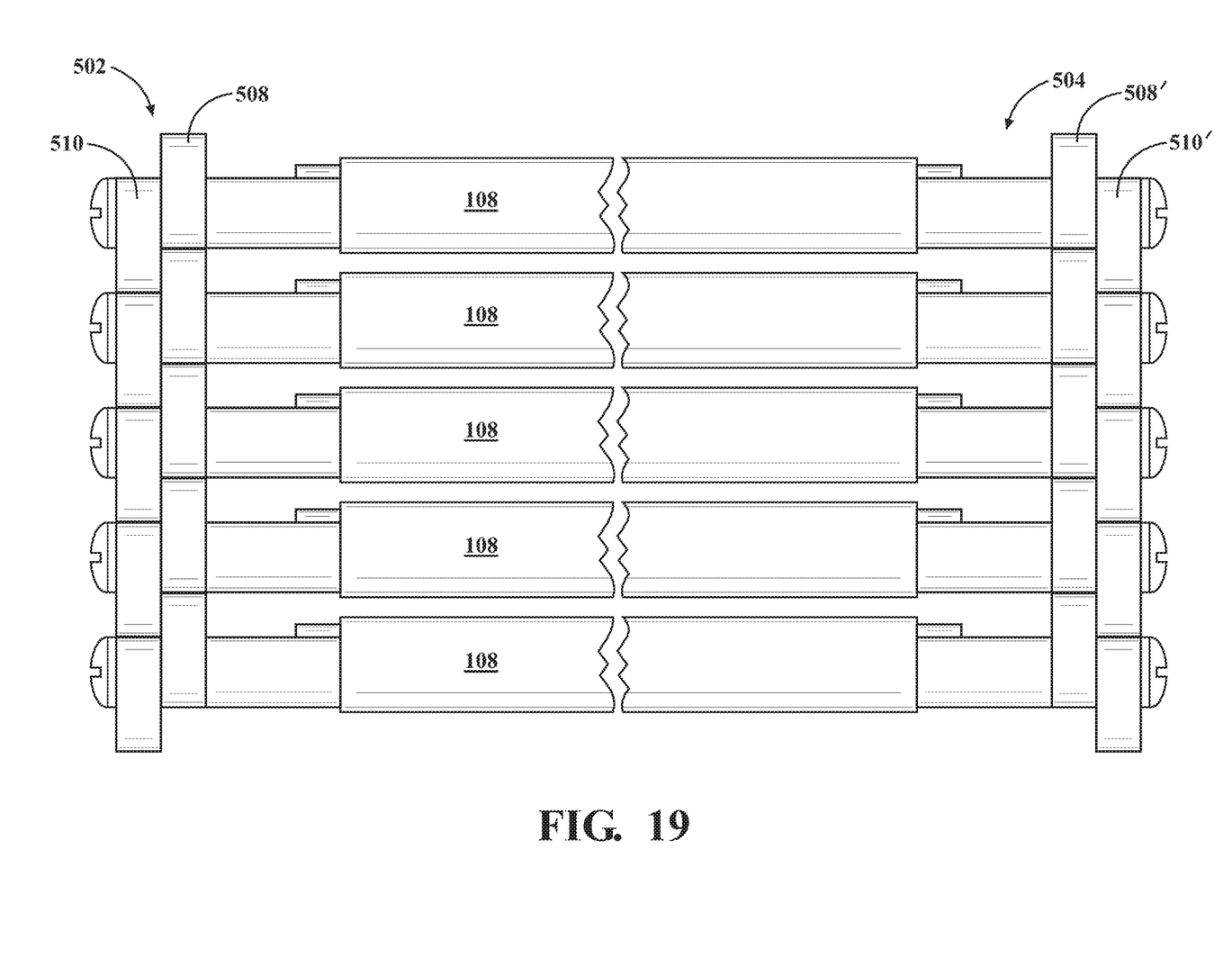
FIG. 19 is an illustration of a nesting arrangement between a plurality of opposite end supported clips, such as in the rolled up position and by which the clips maintain proper lineal alignment of the slats both in the rails and when retracted in an overhead storage position.

Finally, FIG. 19 is an illustration of a nesting arrangement between a plurality of opposite end supported clips 502/504 as shown in FIGS. 13-14, such as which occurs in a rolled up position (see again FIG. 12) and by which the clips maintain proper lineal alignment of the slats 108 both in the rails and when retracted in an overhead storage position. Without limitation, the slats 108 are typically curved or arcuate in profile (as previously described) and can be wound into an overhead positioned enclosure for storing the slats when not in use. Alternatively, the slates can be retracted from the rails into a variety of different storage configuration of reduced volume.

As shown, this is further assisted by the pattern of each pair of offset support portions 508/510 nesting with those of each succeeding clip in the retracted position. On the opposite side of the slates 108, the clips 504 include a mirror arrangement of offset support portions 508'/510' which likewise establish a nesting arrangement with the succeeding slat end supported clips extending along that side of the assembly.

Having described my invention, other and additional preferred embodiments will become apparent to those skilled in the art to which it pertains, and without deviating from the scope of the appended claims. This can include the shutter assembly described herein being incorporated into a theft-prevention assembly and additional to its use as a storm protection system.

The invention claimed is:

1. A protection system for installation to a structure to extend over an opening, comprising:
  a pair of rails adapted to secure to the structure proximate opposite extending side edges of the opening, wherein each rail has a length extending in a vertical direction and a width extending in a horizontal direction;

each of said rails including inner and outer spaced walls separated by an end wall to define a cavity facing the opening;

a pair of protuberances projecting from said inner and outer spaced walls within said cavity, said protuberances each having side and end surfaces, said protuberances being offset with respect to each other along the width of the rail;

a plurality of slats supported between said rails by clips attached to opposite ends of each of said slats, said clips being received within said rails;

each of said clips having a linear portion extending from said slat between said end surfaces of said protuberances, said clips each further having first and second offset portions extending from said linear portion; and a pair of side surfaces of said offset portions of said clips opposing and displacing relative a pair of said side surfaces of said protuberances in a continuous sliding contact, said linear portion displacing relative said end surfaces of said protuberances to permit said slats and clips to convert said slats between a first extended and covering position between said rails overlaying the opening and a second retracted position from said rails revealing the opening and in which said slats are supported away from the opening.

2. The protection system of claim 1, said offset extending portions of said clips and supporting side surfaces of said protuberances each further comprising angled surfaces.

3. The protection system of claim 1, said extending portions of said clips further comprising tab edges, said supporting side and end surfaces of said protuberances having hook portions opposing said tab edges of said extending portions of said clips.

4. The protection system of claim 1, said slats each further comprising an arcuate cross sectional profile, said slats along with said clips nestling one atop another when said slats are in a rolled-up position.

5. The protection system of claim 1, said rails each further comprising a second cavity adapted to receive a fastener to secure the rail to the building.

6. The protection system of claim 5, further comprising an opening in said second cavity over which is installed a cap.

7. The protection system of claim 6, further comprising a second fastener adapted to extend through an interior wall in each of said rails separating said cavities and engaging a portion of said cap connected to said second cavity.

8. The protection system of claim 7, said cap further comprising an elongated leg.

9. The protection system of claim 8, said second fastener further comprising a screw extending through said elongated leg.

10. A protection system for installation to a structure to extend over a structural opening, comprising:

a pair of rails adapted to secure to the structure proximate opposite extending side edges of the opening, wherein each rail has a length extending in a vertical direction and a width extending in a horizontal direction;

each of said rails including inner and outer spaced walk separated by an end wall to define an accessible cavity;

a pair of protuberances projecting from said inner and outer spaced walls within said cavity, said protuberances each having angled side surfaces and an end surface, said protuberances being offset with respect to each other along the width of the rail;

a plurality of slats supported between said rails by clips attached to opposite ends of each of said slats, said cups being received within said rails;

each of said clips having a linear portion extending from said slat between said end surfaces of said protuberances, said cups each further having first and second offset portions extending from said linear portion; and a pair of angled side surfaces of said offset portions of said clips opposing and displacing relative a pair of said angled side surfaces of said protuberances in a continuous sliding contact, said linear portion concurrently displacing relative said end surfaces of said protuberances to permit said slats and clips to convert said slats between a first extended and covering position between said rails overlaying the opening and a second retracted position from said rails revealing the opening and in which said slats are supported away from the opening.

11. A protection system for installation to a structure to extend over a structural opening, comprising:

a pair of rails adapted to secure to the structure proximate opposite extending side edges of the opening, wherein each rail has a length extending in a vertical direction and a width extending in a horizontal direction;

each of said rails including inner and outer spaced walls separated by an end wall to define a cavity facing the opening;

a pair of protuberances projecting from said inner and outer spaced walls within said cavity, said protuberances each having side surfaces and an end extending hook defining at least one end surface, said protuberances being offset with respect to each other along the width of the rail;

a plurality of slats supported between said rails by dips attached to opposite ends of each of said slats, said clips being received within said rails;

each of said clips having a linear portion extending from said slat between said end surfaces of said protuberances, said clips each further having first and second offset portions extending from said linear portion, said dips further including tab edges extending from said offset portions and opposing said end extending hooks of said protuberances; and a pair of side surfaces of said offset portions of said dips opposing and displacing relative a pair of said side surfaces of said protuberances and said hook end surfaces in a continuous skiing contact, said linear portion concurrently displacing relative said protuberances to permit said slats and dips to convert said slats between a first extended and covering position between said rails overlaying the opening and a second retracted position from said rails revealing the opening and in which said slats are supported away from the opening.

* * * * *